United States Patent
Heredia et al.

(10) Patent No.: US 10,135,630 B2
(45) Date of Patent: Nov. 20, 2018

(54) SYSTEM AND METHOD FOR COUPLING A WIRELESS DEVICE TO SOCIAL NETWORKING SERVICES AND A MOBILE COMMUNICATION DEVICE

(75) Inventors: Rafael Heredia, Easley, SC (US); Michael Wayne Crowe, Clover, SC (US); Russell Herbert Fleming, Gastonia, NC (US); Christopher Ross Squires, Greenville, SC (US)

(73) Assignee: Xerox Corporation, Norwalk, CT (US)

( * ) Notice: Subject to any disclaimer, the term of this patent is extended or adjusted under 35 U.S.C. 154(b) by 1379 days.

(21) Appl. No.: 13/321,507

(22) PCT Filed: May 14, 2010

(86) PCT No.: PCT/US2010/034844
§ 371 (c)(1),
(2), (4) Date: Nov. 18, 2011

(87) PCT Pub. No.: WO2010/135174
PCT Pub. Date: Nov. 25, 2010

(65) Prior Publication Data
US 2012/0066286 A1 Mar. 15, 2012

Related U.S. Application Data

(60) Provisional application No. 61/179,506, filed on May 19, 2009.

(51) Int. Cl.
*G06F 15/16* (2006.01)
*H04L 12/28* (2006.01)
(Continued)

(52) U.S. Cl.
CPC .... *H04L 12/2814* (2013.01); *G06F 17/30899* (2013.01); *G06Q 10/10* (2013.01);
(Continued)

(58) Field of Classification Search
USPC .................................. 709/201, 204, 217, 238
See application file for complete search history.

(56) References Cited

U.S. PATENT DOCUMENTS 6,499,017 B1   12/2002   Feibelman et al.
7,111,053 B1   9/2006    Black et al.
(Continued)

OTHER PUBLICATIONS

International Search Report and Written Opinion of the International Searching Authority corresponding to PCT Application No. PCT/US2010/034844, International Bureau of WIPO, Geneva, Switzerland, Nov. 22, 2011 (7 pages).
(Continued)

*Primary Examiner* — Joseph E Avellino
*Assistant Examiner* — Marshall M McLeod
(74) *Attorney, Agent, or Firm* — Maginot Moore & Beck LLP

(57) ABSTRACT

A system enables digital appliances to couple to third party application services directly. The system includes a device regulation/support site configured to generate a script program and a data template, and a digital appliance that selectively couples to the device regulation/support site and receives the script program and data template from the device regulation/support site, the digital appliance executes the script program with reference to the data template to couple directly to a third party application service and query the third party application service for data.

14 Claims, 12 Drawing Sheets

(51) Int. Cl.
  *G06Q 10/10* (2012.01)
  *H04L 29/08* (2006.01)
  *G06F 17/30* (2006.01)
  *H04L 12/24* (2006.01)

(52) U.S. Cl.
  CPC .......... *H04L 41/0806* (2013.01); *H04L 67/34* (2013.01); *H04L 67/125* (2013.01)

(56) References Cited

U.S. PATENT DOCUMENTS

| | | |
|---|---|---|
| 7,185,059 B2 | 2/2007 | Daniell et al. |
| 7,275,215 B2 | 9/2007 | Werndorfer et al. |
| 7,363,378 B2 | 4/2008 | Holmes et al. |
| 7,428,585 B1 | 9/2008 | Owens, II et al. |
| 7,484,176 B2 | 1/2009 | Blattner et al. |
| 7,536,450 B2 | 5/2009 | Motoyama et al. |
| 7,606,866 B2 | 10/2009 | Mora |
| 7,640,336 B1 | 12/2009 | Lu et al. |
| 7,675,903 B2 | 3/2010 | Ozugur et al. |
| 7,739,367 B2 | 6/2010 | Ding |
| 7,835,736 B2 | 11/2010 | Larocca |
| 7,853,652 B2 | 12/2010 | McCarty |
| 7,853,668 B2 | 12/2010 | Daniell et al. |
| 7,886,232 B2 | 2/2011 | Fish |
| 7,908,327 B2 | 3/2011 | Kucharewski et al. |
| 8,027,335 B2 | 9/2011 | Ansari et al. |
| 8,223,938 B2 | 7/2012 | Cassanova et al. |
| 8,280,978 B2 | 10/2012 | Ansari et al. |
| 8,595,186 B1* | 11/2013 | Mandyam ................ G06F 8/38  707/632 |
| 2003/0117280 A1 | 6/2003 | Prehn |
| 2003/0210265 A1 | 11/2003 | Haimberg |
| 2005/0172001 A1 | 8/2005 | Zaner et al. |
| 2006/0031504 A1 | 2/2006 | Hegli et al. |
| 2006/0253584 A1 | 11/2006 | Dixon et al. |
| 2007/0061700 A1 | 3/2007 | Kothari et al. |
| 2007/0180100 A1 | 8/2007 | Biggs et al. |
| 2008/0021777 A1* | 1/2008 | Mack ................ G09F 21/04  705/14.1 |
| 2008/0109788 A1 | 5/2008 | Prieto |
| 2008/0201420 A1 | 8/2008 | Wong et al. |
| 2008/0313714 A1* | 12/2008 | Fetterman ............ H04L 63/08  726/4 |
| 2009/0138579 A1* | 5/2009 | Jung ............................ 709/221 |
| 2010/0262619 A1* | 10/2010 | Zargahi ................ G06F 8/61  707/770 |

OTHER PUBLICATIONS

Hu et al.; Blocking MSN: A Case Study of Preventing the Abuse of IM; Asia-Pacific Conference on Communications; Oct. 3-5, 2005; IEEE; pp. 1112-1116; Perth, Western Australia.

Yawclak et al.; IPoIM: Internet Protocol over Instant Messaging; Military Communications Conference; Oct. 23-25, 2006; IEEE; 7 pages; Washington, D.C.

Osborne et al.; RVP: A Presence and Instant Messaging Protocol; http://www.cs.columbia.edu/sip/drafts/rvp.txt; Jun. 2000; 35 Pages.

International Searching Authority, International Search Report for International Application No. PCT/US/10/34844, dated Jul. 12, 2010 (8 pages).

Supplementary European Search Report and Opinion of the Searching Authority corresponding to EP Application No. European Patent Office, Munich, Germany; May 14, 2014 (10 pages).

* cited by examiner

SYSTEM AND METHOD FOR COUPLING A WIRELESS DEVICE TO SOCIAL NETWORKING SERVICES AND A MOBILE COMMUNICATION DEVICE

PRIORITY CLAIM

The present application claims priority to earlier filed PCT application PCT/US2010/034844, which is entitled "System And Method For Coupling A Wireless Device To Social Networking Services And A Mobile Communication Device," and was filed on May 14, 2010. This application further claims priority to earlier filed U.S. provisional application No. 61/179,506, which is entitled "System And Method For Coupling A Wireless Device To Social Networking Services And A Mobile Communication Device," and was filed on May 19, 2009.

TECHNICAL FIELD

This invention relates to data communications and, more particularly, to data communication between wireless devices and third party application services.

BACKGROUND

Social networking services, such as MySpace and Facebook, are third party application services that enable users to communicate with one another and share information, such as multimedia, music, digital images, and the like. Online photo services, such as Flickr, Picasa, and Photobucket, are commonly used by users who upload their digital pictures to them so that they can view the pictures and share them with friends and families. Some online photo services also enable people to share their photos with other users of the same service in a similar fashion to the popular social networking services previously noted.

To avoid lengthy cables in a home or small office environment, many of these locations use wireless routers to communicate wirelessly with computers located in the home or office. The wireless router enables the computers wirelessly coupled to it to access the Internet. By using a Wi-Fi router, computers in the home or office are coupled together in a LAN without requiring cables to be coupled between the computers and the router for communication purposes. Wi-Fi routers include a wireless transceiver and computer that typically implement the 802.11b, 802.11a, 802.11g, 802.11n, or some other known wireless communication standard that supports Internet or other wide area network communications between the devices coupled to the wireless LAN and those available through an ISP. Expanded use of wireless networking in the home, coupled with the broad availability of a variety of consumer media content in digital form has resulted in an increasing number of consumer appliances being offered with standard or optional wireless networking capability. Such appliances may include, for example, A/V receivers, digital picture frames, Internet radios, network music players, and the like.

Currently, these devices may be coupled to social networking sites through a device specific or a service specific server only. For example, a digital picture frame may couple to a digital picture frame server. The digital picture frame server manages an account for a digital picture frame and enables a user to identify one or more sources for pictures to be displayed on the registered frame. The source, for example, may be identified as a particular person's photo album at a photo service site, such as Flickr. Thereafter, the digital picture frame server receives image updates from previously identified sources as those sources are changed and stores the pictures in a photo space for the digital frame at the server. When multiple sources have been identified for a digital frame, this photo space is an aggregation of these multiple sites so the digital frame does not have to query each photo or image service for pictures. Instead, the digital frame queries the digital picture frame server for the update photos that have been downloaded to the digital frame's photo space. Once these update photos have been received and stored in the digital frame, the frame commences display of the new images in the frame. A service specific server enables a digital picture frame to couple to a service application executing on the server, such as Facebook, and receive images from all of the photo albums available at that site.

While the device specific server and the service specific server enable digital picture frames to receive images from third party application services, they suffer from a number of limitations. Among these limitations is the ability to select specific content for a frame from a particular service application. For example, a user having a Facebook account may store multiple photo albums at the user's site in Facebook. The content of some of the photo albums may be appropriate for display at a frame located at one's home, but inappropriate for display at a frame located at business premises. Currently, the ability to specify which photo albums of a user or that user's friends at a social networking site may be accessed for display is unavailable. Additionally, the ability to access multiple service application sites directly is unavailable. Being able to access more sources directly and to enable the selective downloading of content from specific photo albums are desirable.

Another limitation of current service servers is their dependency on special tags to identify content on the server site. When a user uploads content to the server site, the server enables the user to identify a tag by which the content may be accessed. If a user does not label the photos, albums, or other content with a tag, then the content does not appear on the devices that use the special user-defined tags to access the content. Consequently, a user is unable to search for the particular album, photo, or other content associated with an undefined user tag.

SUMMARY

A system enables digital appliances to couple to third party application services directly. The system includes a device regulation/support site configured to generate a script program and a data template, and a digital appliance that selectively couples to the device regulation/support site and receives the script program and data template from the device regulation/support site, the digital appliance executes the script program with reference to the data template to couple directly to a third party application service and query the third party application service for data.

The system supports a method for enabling a digital appliance to communicate with a third party application service directly. The method includes selecting a script program at a device regulation/support site, generating a data template for the script program at the device regulation/support site, receiving the script program and data template at a digital appliance, executing the script program with reference to the data template at the digital appliance, coupling the digital appliance executing the script program directly to a third party application service, generating and sending with the digital appliance a query for data from the third party application service, and transmitting data from the third party application service to the digital appliance in response to the query received from the script program executed by the digital appliance.

The system and method may be used to support a method for completing a transaction with a third party application service. The method includes sending a query for data from a digital appliance to a third party application service, displaying on the digital appliance data returned from the third party application service in response to the query, generating and sending a transaction request to the third party application service that corresponds to a portion of the displayed data, obtaining transaction data, generating a transaction identifier, sending the transaction identifier to a mobile telephone, and storing the transaction identifier in the mobile telephone.

BRIEF DESCRIPTION OF THE DRAWINGS

FIG. 7 is an example display of a data object that enables selection of particular albums of a user and a user's friend at a third party application service.

DETAILED DESCRIPTION

Figure 1:
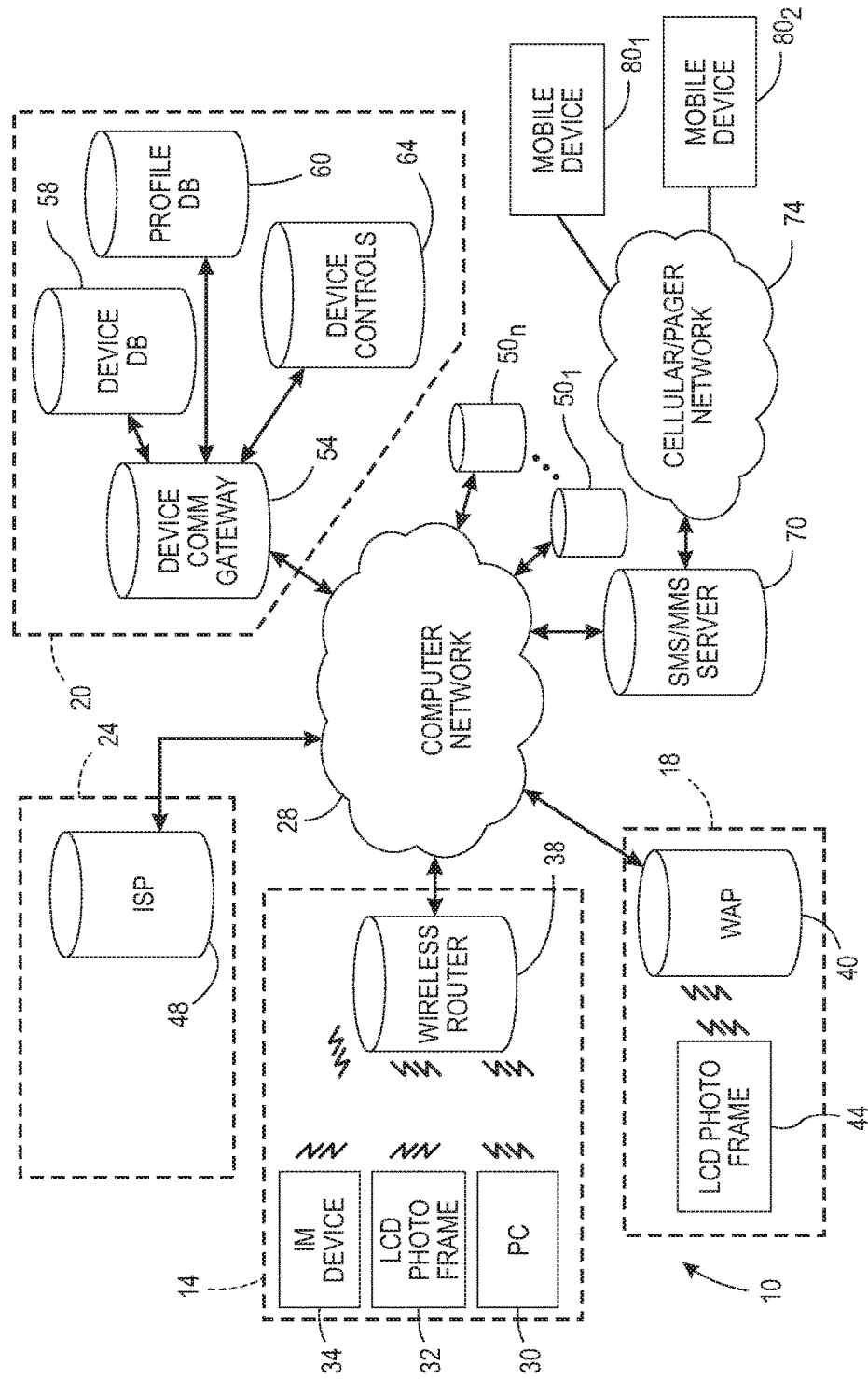
FIG. 1 is a diagram of a system that enables a wireless digital appliance to communicate with third party applications in accordance with rules stored at a device regulation/support site.
Figure 2:
FIG. 2 is an example display of a setup wizard used to obtain registration data for a digital appliance.
Figure 3:
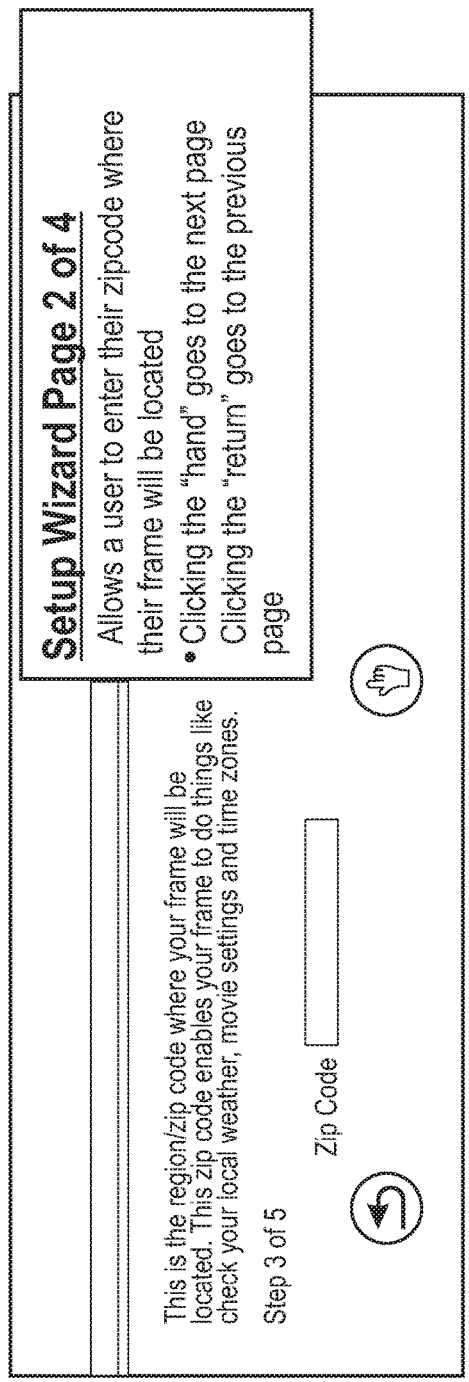
FIG. 3 is an example display of a setup wizard used to obtain location data for a digital appliance.

A system that supports digital appliances and enables communication between mobile devices, digital appliances, and applications servers is shown in FIG. 1. The system 10 includes a home location 14, a remote site location 18, a device regulation/support site 20, an internet service provider site 24, a SMS/MMS server 70, a cellular network 74, and mobile communication devices $80_1$ and $80_2$. The sites and locations are coupled to one another through a computer network 28 and the SMS/MMS server 70 couples the cellular network 74 and the mobile communication devices to the computer network 28. The computer network may be the Internet, the World Wide Web, WANs, LANs, and/or any other type or combination of types of computer communication networks. The home location has a local area network (LAN) that may include a personal computer (PC) 30, a mobile computer communication device, such as an instant messaging terminal 34, and a data receiving and displaying device, such as one or more LCD photo frames 32. These devices communicate with the ISP site 24 or the device regulation/support site 20 through a wireless router 38. The wireless router may wirelessly communicate with the devices at the home site 14 in accordance with one of the IEEE 802.11b, 802.11a, 802.11g, 802.11n, WiMax, or cellular network standards, for example. Using the wireless router 38, the PC 30, photo frame 32, and IM device 34 may access the ISP site 24 and through the ISP site access the device regulation/support site 20.

The wireless router 38 implements a network access controller that uses smart filters to select the packets that are communicated through the wireless gateway. Typically, the wireless gateway is involved in user authentication for regulating access to the network 28 coupled to the wireless router. The wireless router 38 may include or be coupled to an IP address allocation server. This server is sometimes known as a Dynamic Host Configuration Protocol (DHCP) server. Its function is to assign IP addresses to the devices coupled to the router so they have unique IP addresses for communication. The IP addresses most likely assigned to the devices coupled to the wireless router are private IP addresses. These private IP addresses are typically mapped to a single public IP address by a network address/port translator that is a component of the wireless router 38. The network address/port translator is able to determine the corresponding private IP address for messages received from the network 28 that only have the public IP address. Alternatively, the wireless router 28 may use Media Access Controller (MAC) addresses of the devices coupled to it for identifying the devices coupled to the wireless router. Photo frame 32 may operate in different modes based on the type of wireless router 38 that is available. In situations where wireless router 38 is a wireless wide area network (WWAN) router, such as a cellular data network including 3G and 4G connectivity, photo frame 32 may limit available options for downloading data. Due to bandwidth and cost constraints, photo frame 32 may limit the number of photographs that may be received via wireless router 38 during a given time period. Additionally, high-bandwidth functions including video streaming may be disabled while connected to a WWAN network. When photo frame 32 establishes a link with a higher bandwidth wireless local area network (WLAN), such as the 802.11 networks mentioned above, full functionality may be restored.

The remote site 18 includes a wireless access device 40 through which another wireless device 44, such as another LCD photo frame, may access the ISP site 24 and the device regulation/support site 20. The wireless access device 40 may coupled more than one device at site 18 to the network 28. As described in more detail below, a user may associate devices at more than one site with the device controls store at site 20 to push content to multiple sites.

The ISP site 24 includes an ISP host server 48. The ISP host server is a gateway to ISP services and typically requires a computer user attempting to access the ISP services to identify an ISP user account with a username and password. Once the ISP host server confirms a user account exists with the ISP, the ISP server 48 enables communication between devices, such as those at sites 14 and 18, and third party application servers $50_1$ to $50_n$ coupled to the network 28. These third party application servers include web page hosting, email services, search engines, IM messaging, social networking sites, and the like. The servers and databases supporting these services may be coupled to the ISP host 48 through WANs, or LANs, including the Internet.

The device regulation/support site 20 has been developed to support and enable digital appliances, such as IM messaging terminals, digital picture frames, and the like. The device regulation/support site 20 includes a device communication gateway 54 that communicates with a device database 58, a profile server 60, and a device controls database 64. The device regulation/support site 20 provides support services for computer network communication devices that have been registered with the site. In order to provide these services, the regulation site 20 includes identification data for the devices supported by the site. These identification data are supplied to the site by the manufacturers of the digital appliances (FIG. 10) and are stored in the device database 58. These identification data are unique for each device. By allowing registration of only those devices made by particular manufacturers, the operator of the regulation site is assured that the devices have the requisite capabilities for the services supported by the site. The profile server 60 enables users to select and customize device configurations that may be stored at the site by the profile server 60. The device controls database 64 stores the controls and rules selected or generated by an administrative user for a device registered with the regulation/support site 20. These are the rules and controls applied to communications made with a particular digital appliance registered with the site 20. These rules and controls are referenced by a server at site 20 to evaluate communications received from digital appliances controlled through site 20. Communications or device configurations identified in such communications are compared to the authorized rules and configurations stored in database 64. Any non-compliant communications or configurations are overruled by site 20 and deleted from the non-complying device. Authorized rules applied through site 20 may change in response to the type of network connection established by a particular digital device. If the digital device is communicating via a WWAN network, then the types of digital content made available to the device may be restricted. The same device may receive the full array of approved digital content when it connects via a WLAN network. By applying the rules and controls to device communications, rather than account communications, the servers of site 20 in system 10 reduce the risk that a user is able to access unauthorized content through an alternative account without application of the rules and controls. As long as a user is using a device registered with the site 20, the rules and controls are applied to communications from the device regardless of the user account or name through which the instant messaging or communication service is being accessed.

The SMS/MMS server receives data messages that are generated in a either the SMS or MMS server protocol. Digital appliances and the device regulation/support site 20 may generate textual data messages in a Short Message Service (SMS) server protocol for receipt by users having a cellular telephone number as an address. The SMS server protocol messages are sent to the SMS/MMS server. Using the cellular telephone number identified in the SMS server protocol message, the SMS server transmits an SMS message over the cellular network to a mobile communication device in a known manner. In a similar manner, messages with pictorial information are generated in a Multimedia Service (MMS) server protocol and communicated by the SMS/MMS server through the cellular network with mobile devices. The mobile network communication devices may use a standard SMS application program and processor in the device to generate a SMS or MMS message containing textual or pictorial data, respectively, corresponding to a reply entered by the device user. This message is sent to the SMS/MMS server 70. The SMS/MMS server generates a data message in the SMS or MMS server protocol that includes the reply data and transmits the data message over the computer communication network 28 to the digital appliance that sent the SMS or MMS server protocol message. The digital appliance parses the data messages received from the SMS/MMS server and evaluates them with reference to the downloaded rules. Thus, a user of a digital appliance cannot receive messages from a cellular telephone unless the cellular telephone communicates with the SMS/MMS server to which the digital appliance is coupled and unless no rule prevents the communication with that particular cellular phone number.

Figure 4:
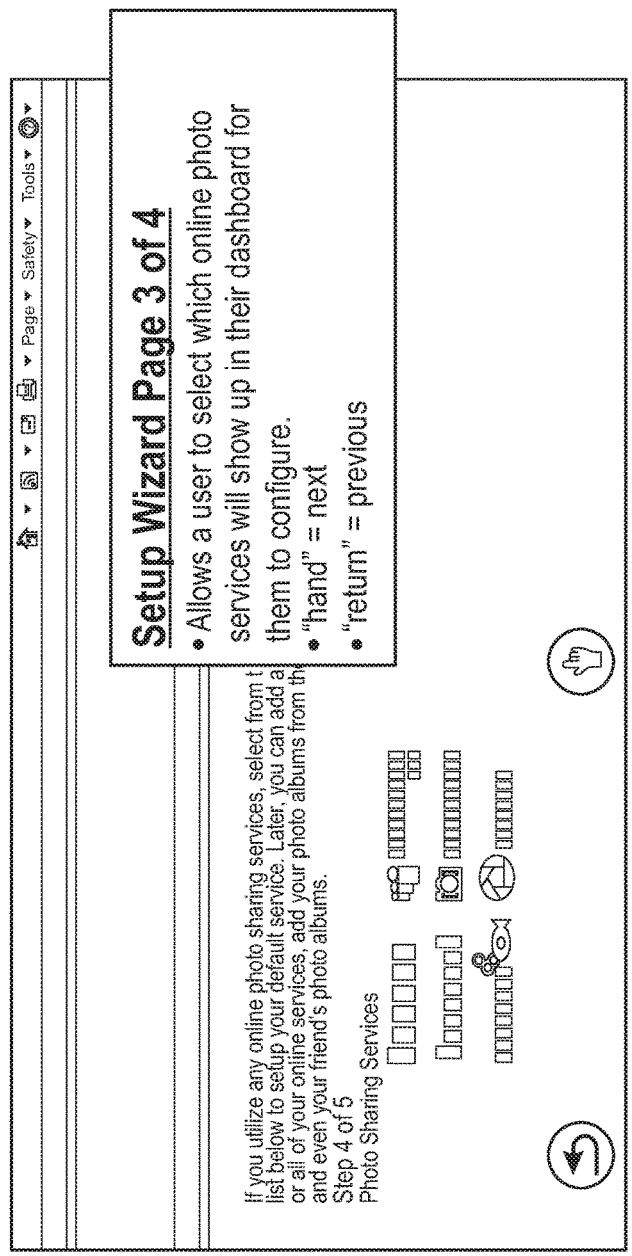
FIG. 4 is an example display of a setup wizard used to obtain photo sharing service data for a digital appliance.
Figure 5:
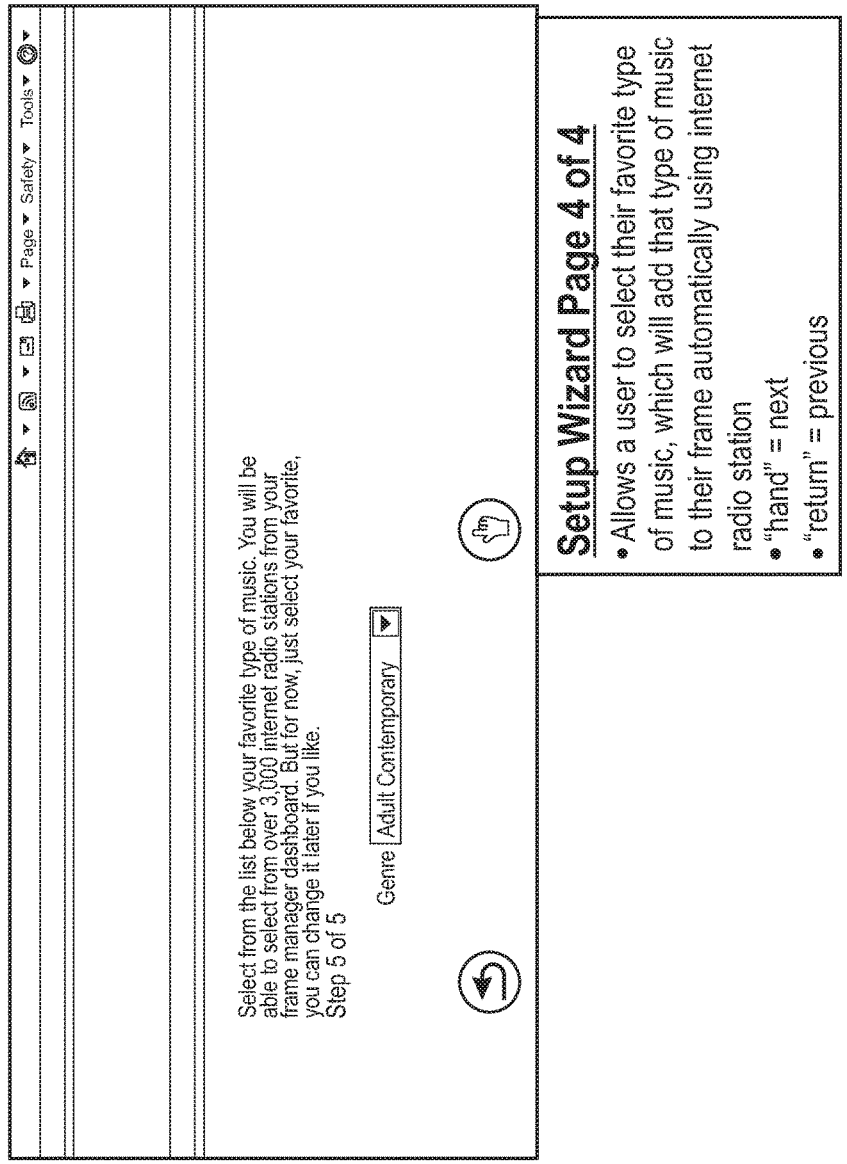
FIG. 5 is an example display of a setup wizard used to obtain ancillary service data for a digital appliance.

More specific reference is now made to the structure and processes that enable the device regulation/support site 20 to provide content to a digital picture frame in a novel manner. After a user has purchased a digital picture frame, the purchaser uses PC 30 to access the device regulation/support site 20 through an ISP. At the site 20, the purchaser activates a setup wizard. In one embodiment, the setup wizard generates a display such as the one shown in FIG. 2 to obtain registration information from the purchaser. The "Frame Auth Code" is a string of alphanumeric characters that the manufacturer associates with the frame. The purchaser enters this code, which uniquely identifies the frame, along with a user generated nickname for the frame. The user also identifies data corresponding to an existing account with the site 20 or that enables site 20 to generate an account for the user. The first user associated with a frame is the administrator for the frame, who can enable/disable the features, services, and widgets associated with a frame. After site 20 confirms the existence of an account for the user or generates an account for the user, a second display is generated by the embodiment. This display (FIG. 3) enables a user to enable information regarding the location for the digital frame. In this embodiment, the location information is provided by the entry of a zip code where the frame is located. The location information enables the frame to receive data to be displayed regarding local weather, events, and time. The setup wizard may then enable the frame user to identify a default photo sharing service (FIG. 4). Ancillary services may also be selected, such as open network music stations (FIG. 5). The data entered in the data objects associated with the displays in FIG. 2 through FIG. 5 are stored in the profile database 60. These data are used to provide image content to the frame.

Figure 6:
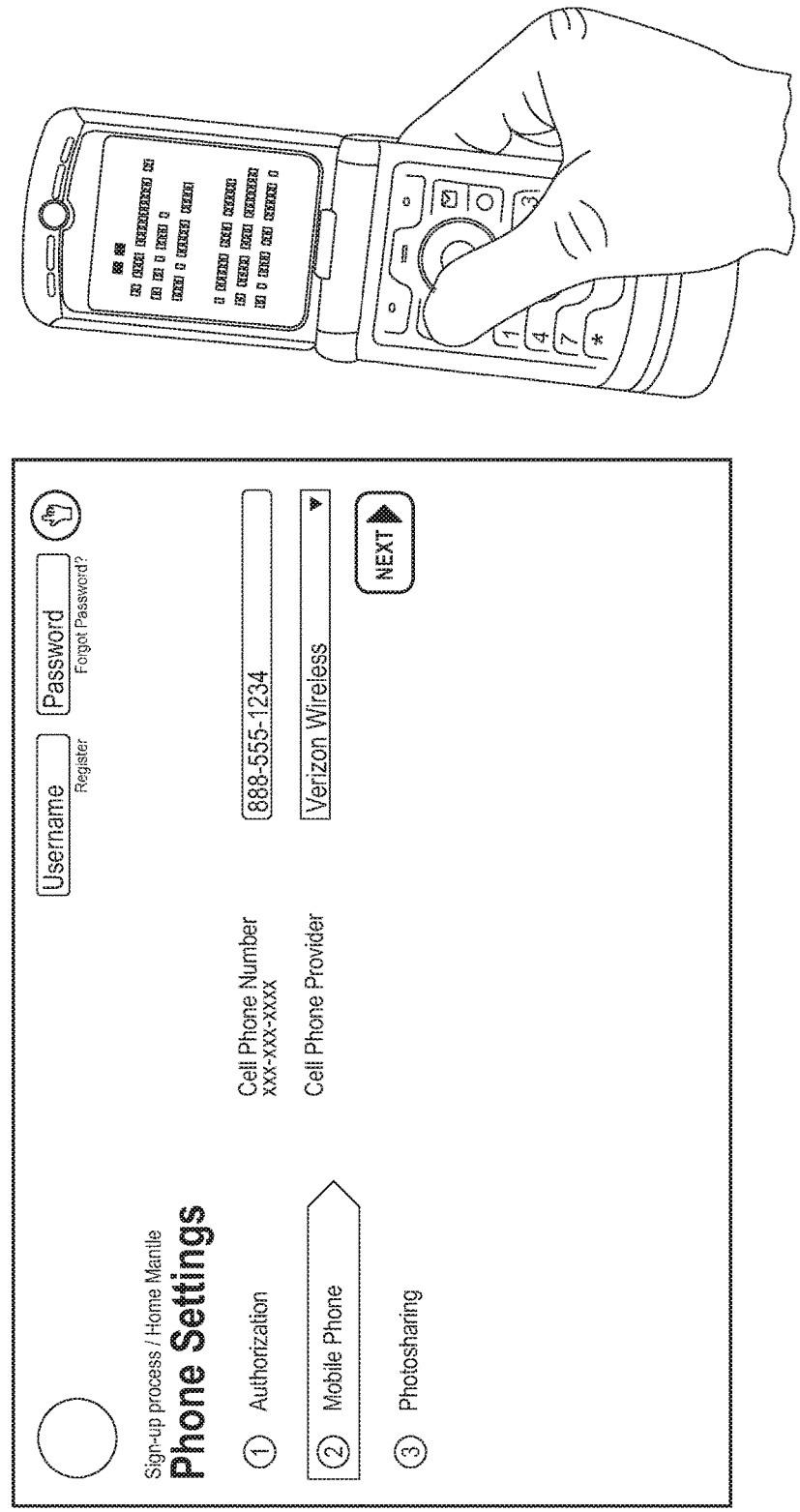
FIG. 6 is an example display of a data object that enables a user to send a message identifying a digital appliance to a mobile telephone for storage in an address book.

Another display that enables a user to identify a source of pictures is shown in FIG. 6. This display may be generated by the setup wizard or it may be an option that a user may select after a frame has been activated and operated. This display includes data objects for obtaining a cell phone number for a mobile telephone from which the user desires to receive images. In the display of FIG. 6, a data object is also provided to obtain data identifying the cell phone provider. In some embodiments, the cell phone service need not be entered by the user as the server(s) for the site 20 are able to identify the phone service from a query sent to a national registry. After this information is stored in the profile database 60, the server(s) of site 20 generates a welcome text message that is sent via device communication gateway 54, network 28, SMS/MMS server 70, and the cellular network 74 to the mobile phone associated with the cell number entered by the user in the display of FIG. 6. The welcome message identifies the frame with the nickname given by the user and invites the mobile phone user to store the address in the message in the address book of the user's mobile phone. Thereafter, the mobile phone user can take a picture with the mobile phone camera, add a caption, if desired, and send it to the address stored in the address book of the mobile telephone. The picture is then sent as a text message through the cellular network 74 and SMS/MMS server 70 to the public address of the wireless router 38, which converts the public address to the private address for the frame, and then to the frame for display.

In order to ensure the devices are operating and communicating in accordance with the rules established for the devices, the site 20 manages the devices registered with the site by assigning times for the devices to communicate with the site 20. These times may be periodic times, such as every five minutes, or a time for a next message may be assigned upon receipt of a message, such as a command to send site 20 a message twenty minutes from the current time. These messages identify the configuration of a device or the most recent or current communications occurring or being attempted by the device. The site 20 compares the configuration data and/or communication data to the device controls stored in database 64. Any non-compliant configurations result in site 20 sending command messages to the device to delete non-conforming configuration elements or to add missing configuration elements. Likewise, any unauthorized communications initiated or attempted by the device result in the site 20 commanding the device to cease the communication and deleting the content of the communication. As these communications are between the device and site 20 without user intervention, the device responds to the communications from site 20 without the user being able to prevent execution of the commands. In this manner, an administrative user can configure rules in the device controls database 64 that are imposed on the devices associated with the user's account regardless of modifications attempted by the person entrusted with the device.

At any time after activation of a frame, a user may use a PC to return to the site 20 to configure the frame further or to alter the settings for the frame. In one embodiment, a page called a dashboard is displayed upon confirmation of a user account with the site 20. The dashboard displays all of the digital appliances associated with a user account. The user may select a digital appliance for further configuration. For example, a user may select services to provide content to the appliance, identify a musical genre or specify internet radio stations for the appliance, alter the appliance name, or delete the appliance from the user's account.

Figure 7:
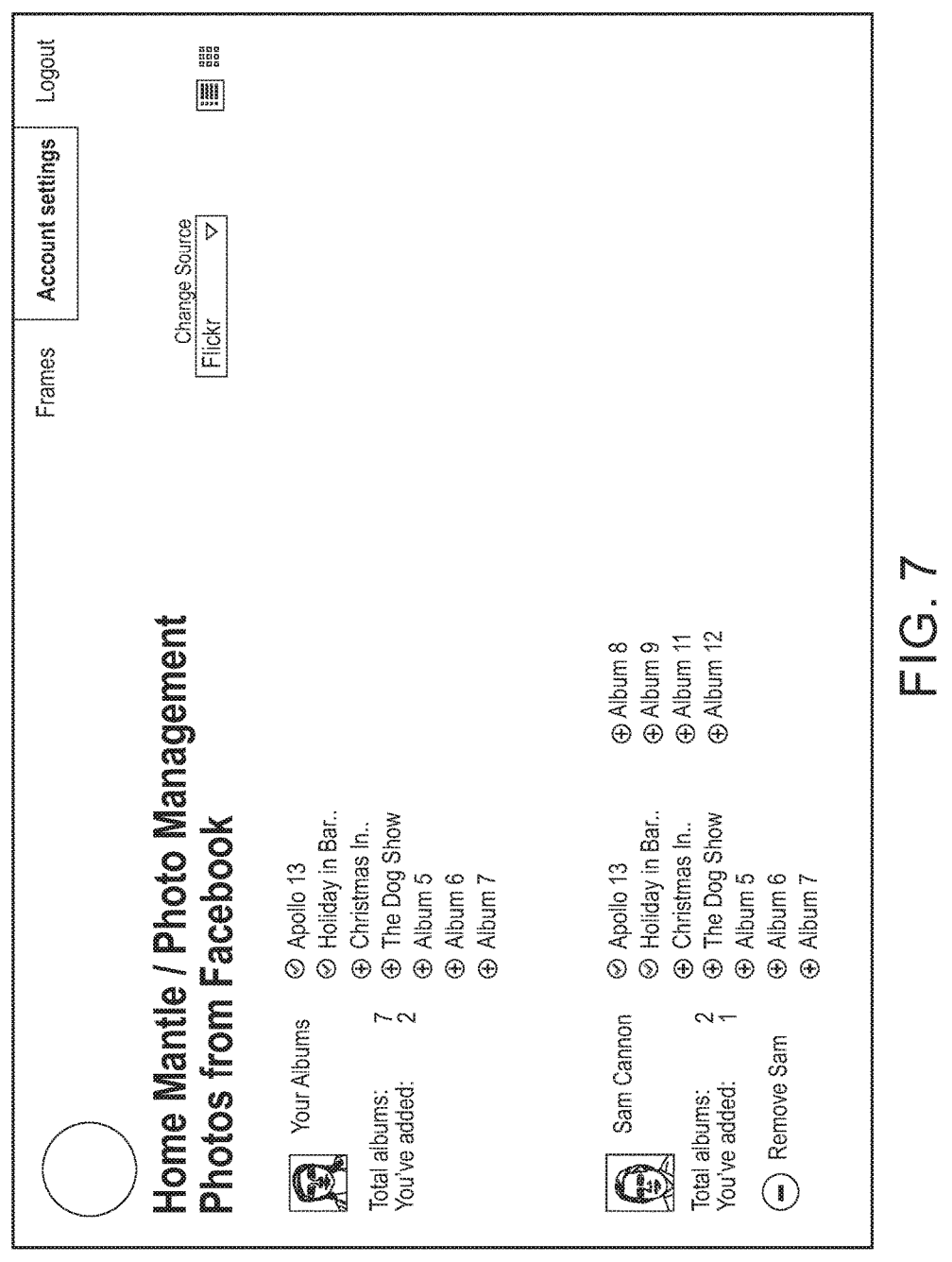

As shown in FIG. 7, selection of photo services enables a user to select the photo albums from which pictures are sent to the digital frame currently selected for configuration. The selections are segregated into two groups: My Albums and My Friends' Albums. Under these two groupings, a listing of all albums available for selection is provided. By clicking a box adjacent an album, a user may select or deselect an album. The album listing under My Friends identifies each friend and the albums available from that friend. The identities of the friends were obtained from the social network site in response to the user selecting the social network site as an authorized source for the digital frame. These identities were then used by the servers of site 20 to locate and identify the albums associated with each friend. The albums are not downloaded to the site 20, instead, the information necessary to query the social networking site for the albums is obtained by the site 20. The site 20 then generates an appropriate data template that is used by a scripting program, as described in more detail below, to communicate with the social networking site. By clicking a box adjacent an album, a user may select specific albums for a friend. Thus, albums that may not be appropriate for a frame located at a particular location can be avoided as sources for images, while a frame located in a more appropriate space may have such albums selected as image sources.

Figure 8:
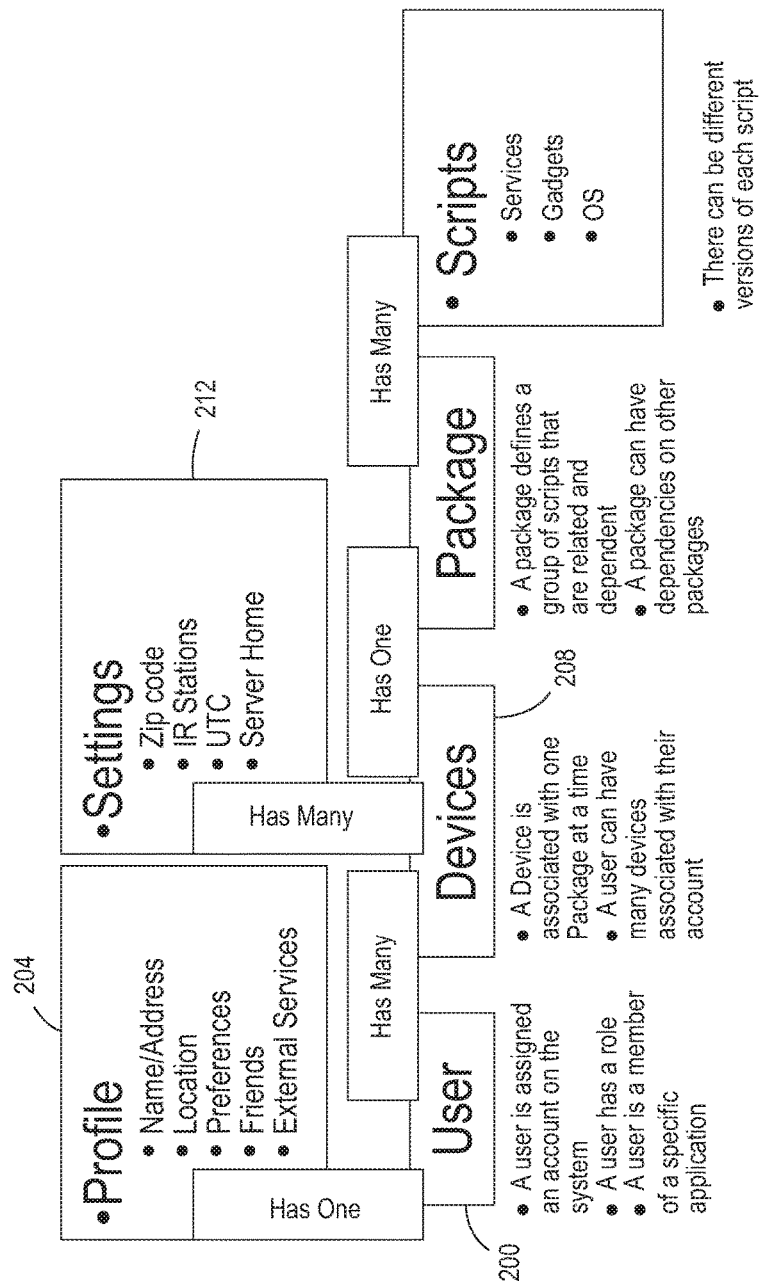
FIG. 8 is a general data model for information stored in the regulation/support site shown in FIG. 1.

As already noted, the site 20 does not download and store images at the site 20. Instead, the servers of site 20 use script programs, which are sometimes called widgets and gadgets, to enable digital frames and other digital appliances to couple directly to social networking sites to obtain image data. The script programs for each type and/or model of a digital appliance are the same to facilitate the selection and downloading of the programs to the devices. The data that enables the programs to perform tasks for different devices differently is obtained by the site 20 from the profile database 60 and the controls database 64 and used to populate a data template that is downloaded to a device for use during execution of the script program. To support this capability, a general data model, such as the one shown in FIG. 8, may be used. A user 200 has a profile 204, which is stored in profile database 60. As already noted, a user 204 may have a plurality of digital appliances 208 associated with the user. Each appliance has a unique identifier obtained from the appliance manufacturer, which is stored in device database 58. Each device has a plurality of settings 212, which are also stored in the database 58. These settings identify the musical skins, internet radio stations, location of the appliance, and other data relevant to the operation of the appliance and for updating the content of the appliance. Each device 208 has one package 216 associated with the device. The package 216 defines a group of scripting language programs that are related and dependent upon one another for operation particular appliances. A package 216 has a plurality of scripting language programs or scripts 220. These scripts are programs that support a third party service application or that operate as gadgets or widgets to achieve particular functionality for a device.

In one embodiment, the scripts 220 are executed with data templates that are implemented in the XML format. In response to device records being received from a manufacturer for digital appliances recently produced, one or more servers of site 20 recognize the device group to which a digital appliance belongs and assign a package for that device group to the device. This package includes keys for encrypting and decrypting message between the digital appliance and the servers of site 20. One or more servers of site 20 also select a default set of scripts for the device that conform with the authorized activities for the device and then appropriate data is used to populate the data templates to provide a default set of device settings and services. Upon registration of the digital appliance with the site 20, these default scripts and data templates are modified with additional scripts for new services or new settings identified by a user or the default data templates may be modified with parameters obtained from the digital appliance configuration data entered by a user. These scripts and data templates are then downloaded to the digital appliance associated with a particular package in the general data model. These scripts and data templates are stored in the digital appliance. At appropriate times, the script programs are executed with reference to the data templates perform functions for the device, such as updating content on the appliance from authorized service applications and/or generating reports for the site 20. These reports are used by the site 20 to verify compliance with the rules and regulations for a device stored in the controls database 64.

The scripts and data templates downloaded for a digital appliance in one embodiment enable the digital appliance to communicate with internet radio stations, third party applications, such as Facebook, MySpace, Photobucket, Flickr, Picasa, Snapfish, Zphoto, and weather data sources, and select appropriate and authorized content for the device. Additionally, the embodiment includes a gadget script and data template. The gadget script is a program that enables movie listing information to be displayed and ticket transactions conducted and the data template enables the gadget to obtain the listing information for theaters in the area identified by the location data and to transact ticket sales for movie showings selected from the displayed listings with the user's third party account or profile data from the site 20. Other scripts that the servers of site 20 may send to a digital appliance in this embodiment include scripts that generate usage reports and other data regarding the sources accessed by the digital appliance.

Figure 9:
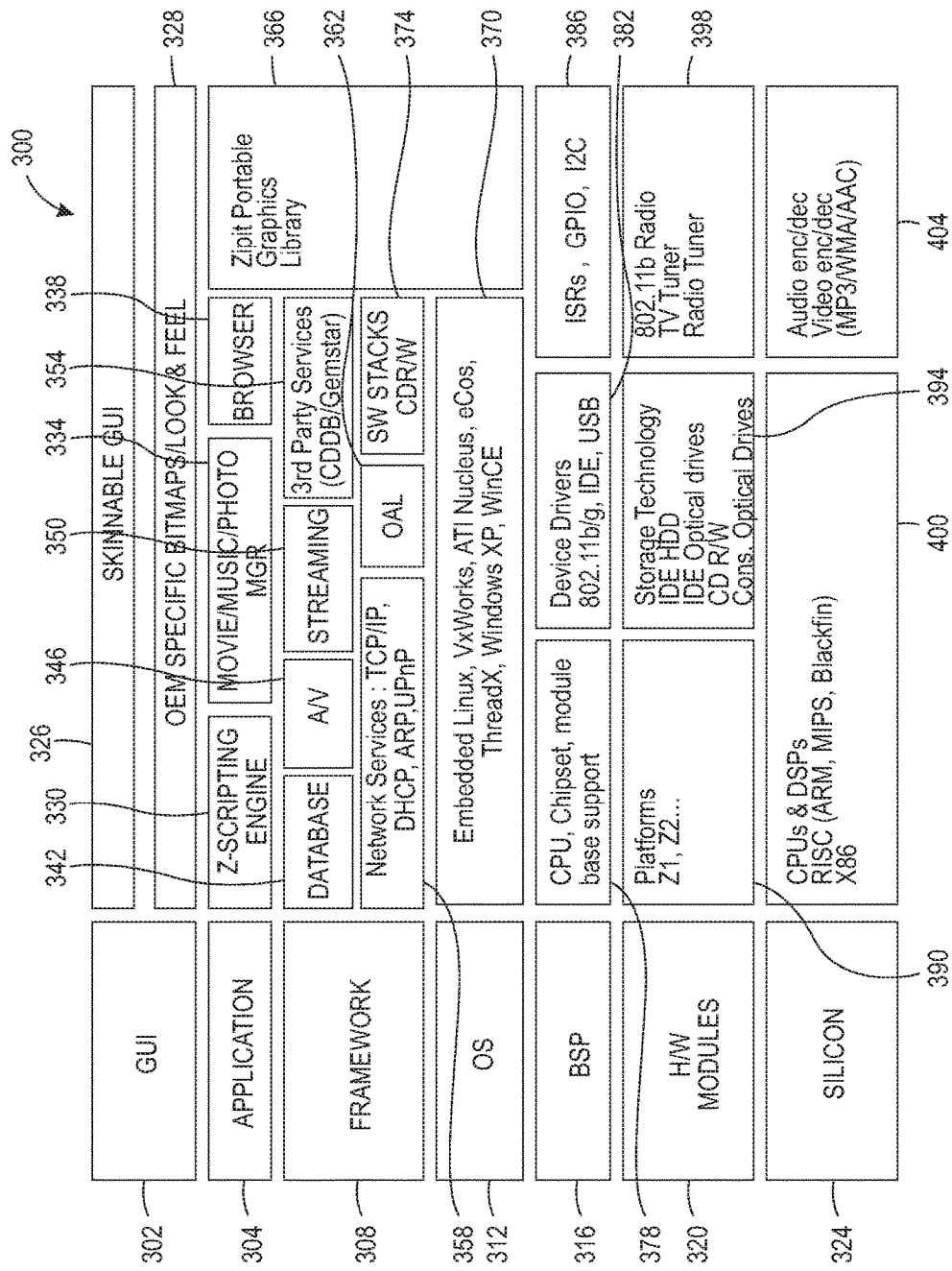
FIG. 9 is a block diagram of system layers in a digital appliance in FIG. 1.

The digital appliances are enabled for communication with the servers of site 20, the servers of third party applications, and other servers with the system capabilities shown in FIG. 9. This system 300 provides a graphic user interface (GUI) layer 302, an application layer 304, a framework layer 308, an operating system layer 312, a base support package (BSP) 316, hardware modules 320, and the appropriate support integrated circuits 324 for the appliance. The GUI layer 302 includes a GUI 326 that has a skin that can be configured by a user using the dashboard described previously. Additionally, a manufacturer may provide specific bit maps and related display elements 328 to site 20 that can be downloaded for use by the system 300. The application layer 304 includes a scripting engine 330 that executes the scripts downloaded from the site 20. A manager 334 for content administration is also provided as well as a browser 338 for user communication with sites over the Internet. The framework layer 308 includes a component 342 for database operations, a component 346 for audio/visual content management, a component 350 for streaming content management, a component 354 for third party application management, a component 358 for network communication management, an OAL component 362 for implementing an operating system abstraction layer, and a component 366 for external storage management. The OS layer 312 includes a component 370 for communication with various operating systems. The OS layer 312, the framework layer 308, and the application layer 304 are all supported by a portable graphics library 374.

With further reference to FIG. 9, the BSP layer 316 includes the main processor and interface circuits 378, the device drivers 382, and other related support circuits 386. Other hardware modules 320 include the circuitry dedicated to platform operation such as IM messaging terminal components 390, storage drives 394, and communication transceivers and tuners 398. The silicon layer 324 refers to other application specific integrated circuits 400, such as digital signal processors, and peripheral hardware 404, such as audio encoder/decoders and video encoder/decoders. As used herein, the term component refers to the programming instructions to implement a function, the circuit(s) that embodies a function, or a combination of both programming instructions and circuit(s). In a similar manner, the term "configuration" for a device includes the software, script programs, data templates, and hardware components, or combinations thereof.

Figure 10:
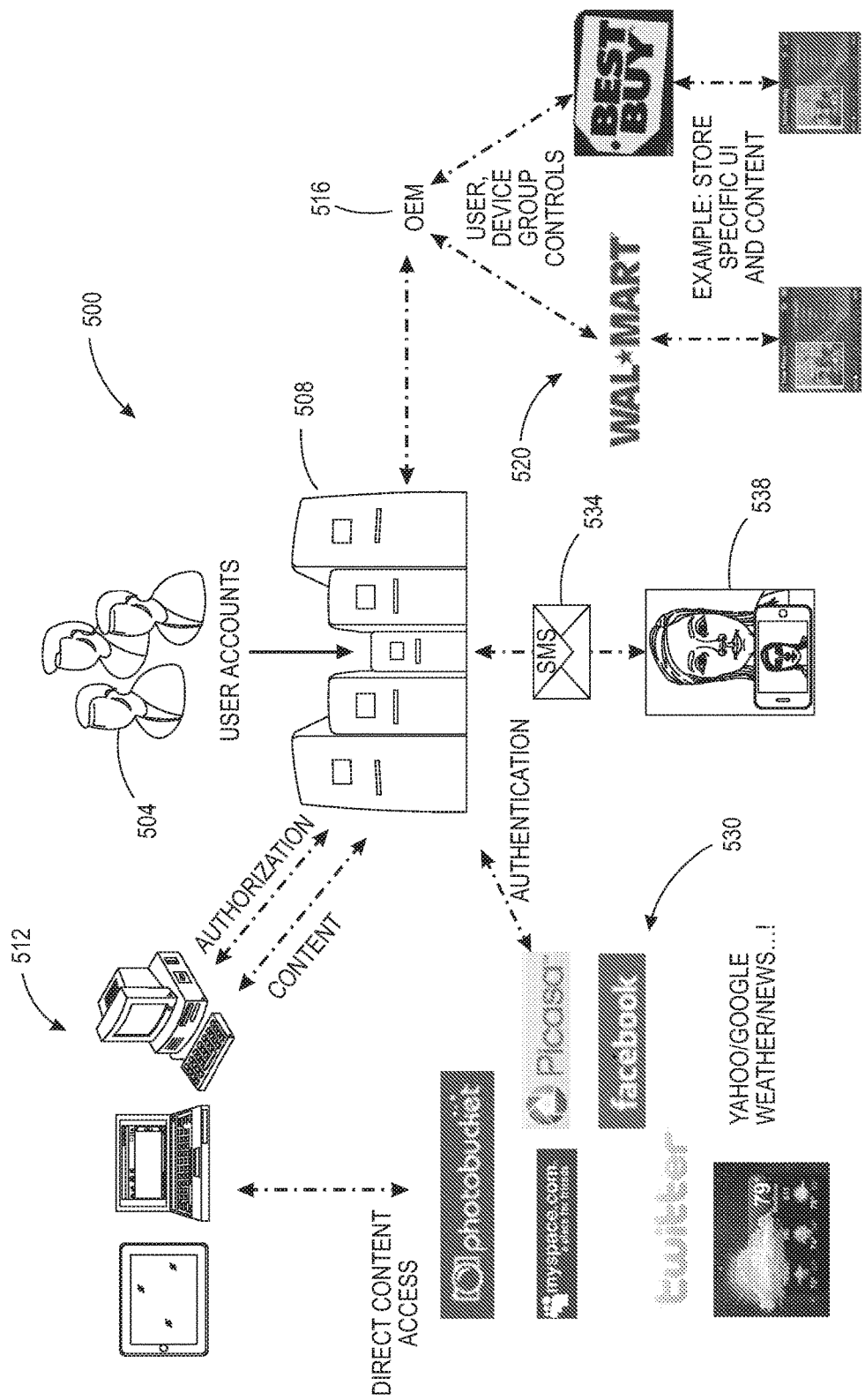
FIG. 10 is an overview of message pathways enabled by the system of FIG. 1.

The functionality of a system having digital appliances enabled with system 300 and the servers of a site 20 is shown in FIG. 10. The system 500 enables users 504 to communicate with the servers 508 of a device support/regulation site to register and configure their digital appliances 512. Manufacturers 516 of the digital appliances provide unique identifiers for the appliances. Additionally, the manufacturers are able to produce a common platform appliance and then specify the interface characteristics or features for appliances sold or otherwise distributed by particular sources 520. These feature sets are defined in packages for devices and communicated by the manufacturers 516 to the servers 508. The servers 508 authenticate the selections and identification of third party accounts with the third party applications 530. Welcome messages for mobile phones are generated and sent to mobile phones 538 through an SMS/MMS interface 534 to enable the phone users to store readily available and easily discernible addresses for sending text messages and images to appliances 512. In response to registration and configuration of the appliances, the servers 508 generate and download scripts with data templates to the appliances 512. Execution of these scripts with reference to the appropriate data templates by the digital appliances enables the appliances to communicate directly with third party applications to obtain and update content from these sources. Consequently, the servers at site 20 do not operate as a bottleneck in the delivery of content to the appliances 512.

Figure 11:
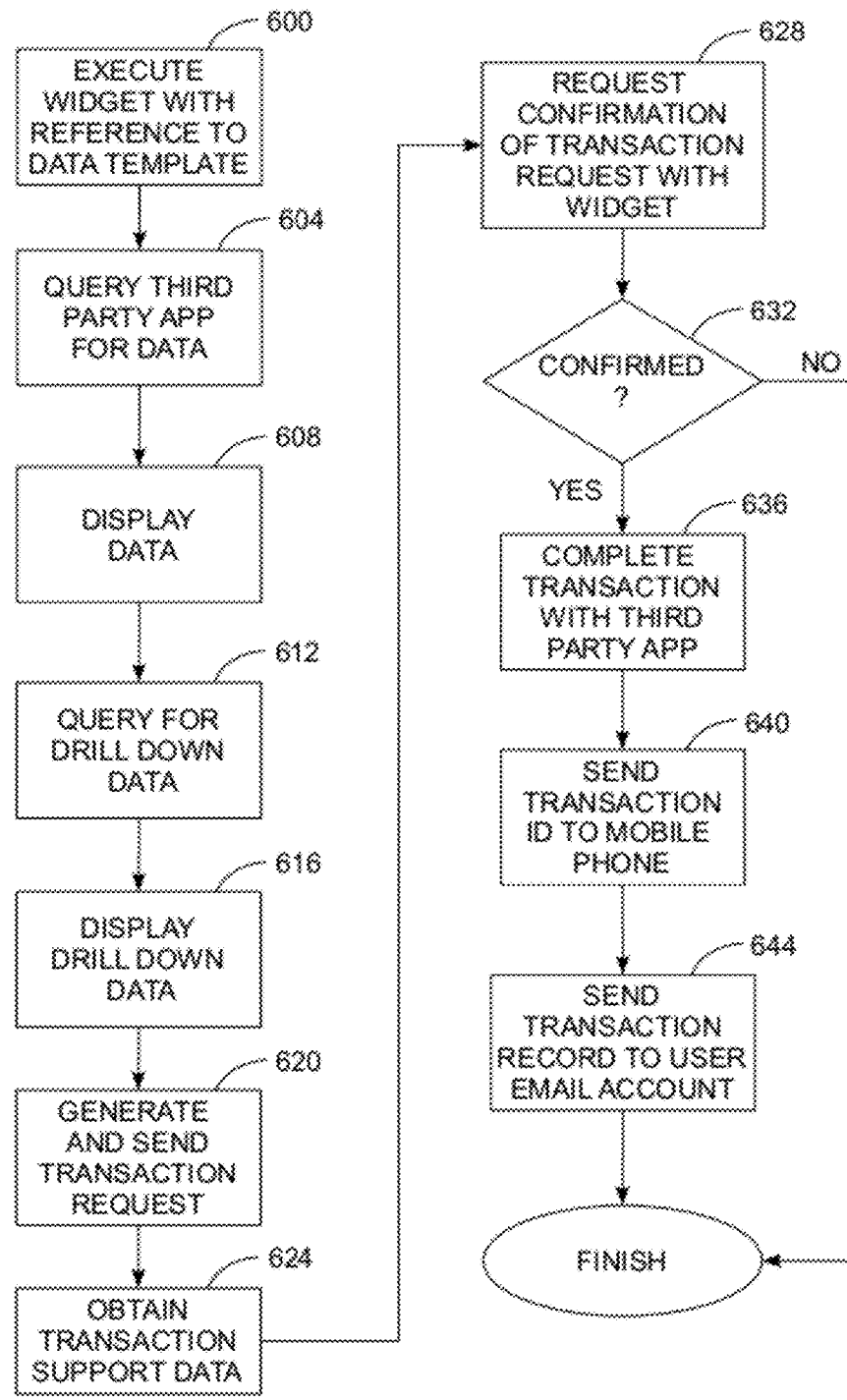
FIG. 11 is a flow diagram of a process enabled by a widget received from the regulation/support site of FIG. 1.

The system 500 enables widgets and gadgets to be selected and downloaded with data templates by the servers 504 that enable a digital appliance to coordinate a variety of transactions. For example, a movie widget may be selected by the servers 504 and downloaded with a data template to a digital appliance enabled by system 300 to enable the system 10 to perform the process shown in FIG. 11. In this example, a digital picture frame receives the movie widget and data template. As the digital picture frame executes the movie widget script with reference to the data template (block 600), the picture frame queries a third party application site for movies showing at a theater identified by the data template (block 604). The theater was previously selected by the user through the dashboard for the user's account. As the movies are displayed on the frame with the poster art (block 608), a user may operate the GUI of the picture frame to query for drill down data, which in this case includes the show times for a particular movie (block 612). After viewing the returned data (block 616), the user selects a movie and show time by operating the GUI and the widget generates a transaction request for tickets to the selected showing (block 620). The transaction request may be sent to a third party application at which the user has an existing account or one that requires payment information for the transaction. In the example being discussed, the ticket transaction request may be sent to a third party ticket application, such as Fandango. This type of third party site requires users to have existing accounts for transactions and the data from such an account to used to support the transaction (block 624). Other third party sites may communicate with the servers 504 of site 20 to obtain credit card information from the user's profile to pay for the requested tickets (block 624). Either the third party application or the servers 504 communicate with the movie widget script to confirm the ticket request (block 628) and, if confirmed (block 632), complete the payment transaction securely with the third party application (block 636). A transaction identifier may be generated by third party application or the servers 504 and the transaction identifier may be transmitted via the SMS/MMS interface to the user's telephone identified in the user's profile (block 640). Additionally, a transaction record may be generated that is sent to the user's email account, which is also identified in the user's profile (block 644). The user then goes to the theater and displays the transaction identifier with the user's mobile telephone to view the movie. If the transaction request is not confirmed by the widget (block 632), the process terminates without a transaction being consummated. Other widgets are also supported by such a system. For example, a widget for a social networking site may generate updates for appointment changes for a group calendar kept by friends on such a site.

Figure 12:
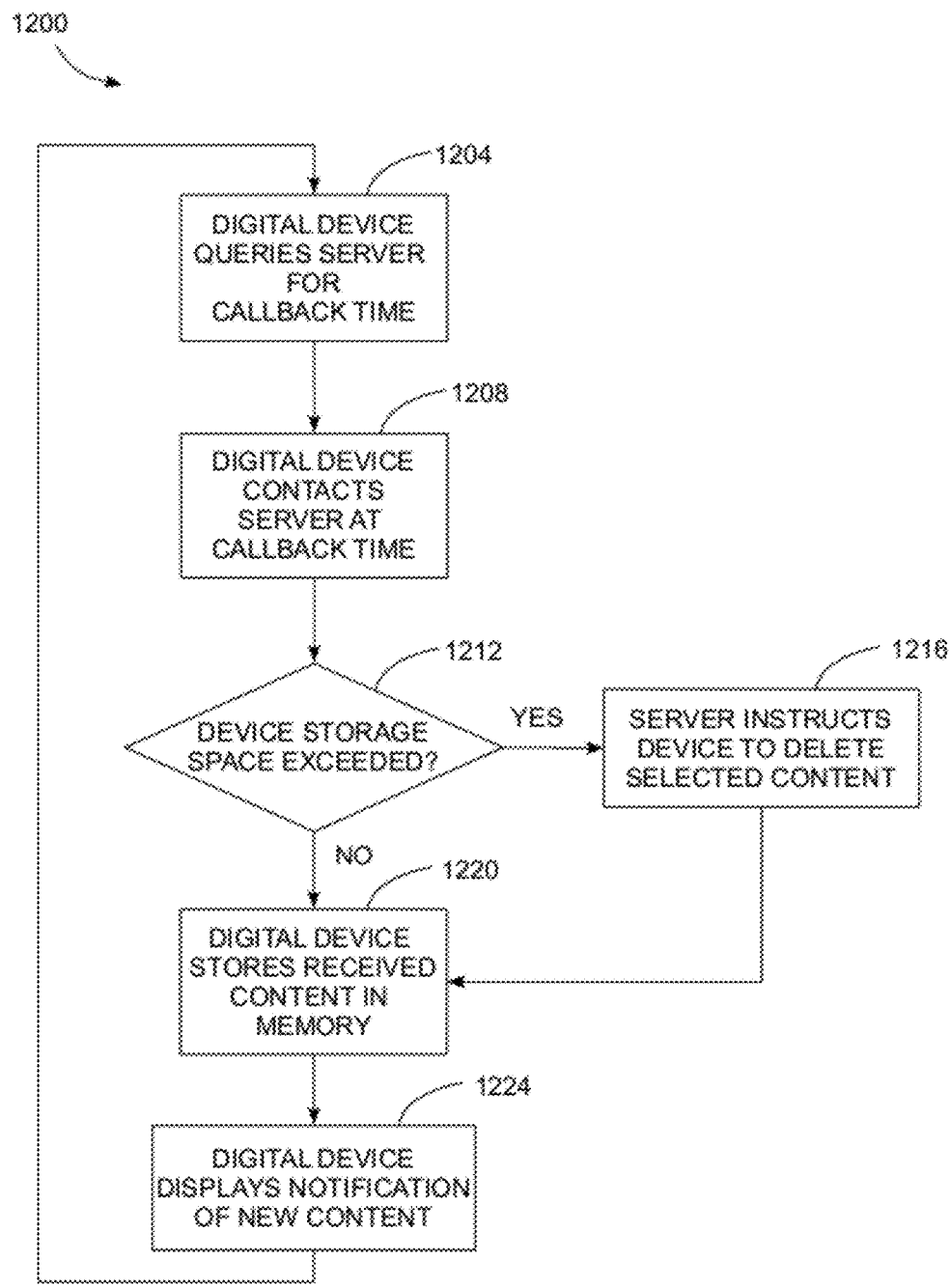
FIG. 12 is a flow diagram of an alternative process for selectively receiving and storing digital content in the digital appliance using a wireless wide area network.

A process 1200 for selectively sending digital content to a digital device such as photo frame 32 is depicted in FIG. 12. Process 1200 selectively allows network communications between the digital device and one or more remote servers storing digital content. One network configuration that may employ process 1200 includes a digital device communicating with remote servers via a network that has restricted bandwidth and is subject to heavy network congestion. Examples of such networks include cellular data networks including 3G and 4G networks. As described above, the types of content sent to the digital device while using these networks may be restricted. Process 1200 describes a method for sending allowable digital content in a manner suited to networks subject to bandwidth and congestion constraints.

Referring to FIG. 12, process 1200 begins with a digital device, such as photo frame 32, querying a server for a time when the digital device may begin downloading content data (block 1204). The server may be part of regulation/support site 20. The server returns a time when the digital device may begin receiving stored content, also known as a "callback time". In the embodiment of FIG. 12, the time may be determined based on various factors, including the time of day in the time zone where the digital device is active, the amount of time that has elapsed since the digital device last received content, and predicted network congestion for various times of the day based on network congestion measurements. In one embodiment, the server sets a callback time to a time predicted to have a lower level of network traffic congestion present on the wireless network being used to send digital content to the digital device. The digital device waits for the appropriate callback time, and contacts the server to begin downloading content (block 1208). In situations where the digital device is set to download content that will exceed the available storage capacity in the device (block 1212), the device selectively deletes a portion of stored digital content in response to deletion instructions sent by the server (block 1216). Once the digital device has sufficient storage space to store new content, the digital device proceeds to download the content from the server (block 1220). The amount of digital content downloaded may be regulated by the server to keep the amount of data traffic placed on the wireless network within a predetermined range. For example, each callback may limit the amount of transferred data to a maximum transfer of 10 megabytes for each scheduled callback, although the transfer limit may be raised or lowered to accommodate various wireless networks. Upon receiving new digital content, the digital device displays a notification that new content is ready for viewing (block 1224). This notification may include an on-screen alert, or a notification sound may be played to announce the availability of newly downloaded content. The digital device periodically requests updated content by requesting a new callback time from the server in order to download new digital content (block 1204).

While the system and method for have been illustrated by the description of exemplary processes and system components, and while the various processes and components have been described in considerable detail, applicant does not intend to restrict or in any limit the scope of the appended claims to such detail. Additional advantages and modifications will also readily appear to those skilled in the art. Therefore, the system and method described above in their broadest aspects are not limited to the specific details, implementations, or illustrative examples shown and described. Accordingly, departures may be made from such details without departing from the spirit or scope of applicant's disclosed system and method.

What is claimed is:

1. A system for supporting digital appliances comprising:
    a digital appliance that selectively couples to at least one server associated with a device regulation/support site, the digital appliance having a processor configured to:
        transmit a device identifier corresponding to a manufacturer of the digital appliance to the at least one server;
        receive a script program and a data template from the at least one server; and
        execute the script program with reference to the data template to couple directly to a third party application service server and query the third party application service server for data; and
    the at least one server associated with the device regulation/support site being configured to:
        generate the script program and the data template with reference to the device identifier received from the digital appliance and with reference to manufacturer data stored at the at least one server; and
        transmit the script program and the data template to the digital appliance.

2. The system of claim 1, the at least one server being further configured to generate and send a message having an address for the digital appliance to a mobile telephone to enable the mobile telephone to send data to the digital appliance.

3. The system of claim 1 wherein the digital appliance is a digital picture frame.

4. The system of claim 1 wherein the processor of the digital appliance executes the script program with reference to the data template and couples directly to a social networking application service server.

5. The system of claim 4 wherein the script program executed by the processor of the digital appliance queries the social networking application service server for updates to at least one selected photo album in a plurality of photo albums associated with a user of the digital appliance and at least one friend for that user, both of which are identified by the data template.

6. The system of claim 1 wherein the data template is implemented in an XML format.

7. The system of claim 1 further comprising:
    a device database operatively connected to the at least one server, the device database being configured to store a plurality of packages in association with a plurality of device identifiers corresponding to manufacturer data for a plurality of digital appliances, each package including a plurality of scripts for execution by a digital appliance corresponding to the device identifier associated with the package.

8. A method for enabling a digital appliance to communicate with a third party application service comprising:
    transmitting a device identifier corresponding to a manufacturer of the digital appliance from the digital appliance to at least one server associated with a device regulation/support site;
    selecting a script program with the at least one sever associated with the device regulation/support site with reference to the device identifier transmitted from the digital appliance and with reference to manufacturer data stored at the at least one server associated with the device regulation/support site;

generating a data template for the script program with the server associated with the device regulation/support site;

transmitting the script program and data template from the server associated with the device regulation/support site to the digital appliance;

executing the script program with reference to the data template at the digital appliance;

coupling the digital appliance executing the script program directly to a third party application service;

generating and sending with the digital appliance a query for data from the third party application service; and transmitting data from the third party application service to the digital appliance in response to the query received from the script program executed by the digital appliance.

9. The method of claim 8 further comprising:

sending a message having an address for the digital appliance from the server associated with the device regulation/support site to a mobile telephone to enable the mobile telephone to send data to the digital appliance.

10. The method of claim 8, the execution of the script program with the digital appliance further comprising:

executing the script program with a digital picture frame.

11. The method of claim 8, the transmission of the data from the third party application service further comprising:

transmitting data from a social networking application service server to the digital appliance.

12. The method of claim 11 wherein the query sent to the social networking application service requests updates to photo albums selected from a plurality of photo albums associated with a user and at least one friend for that user, both the user and the at least one friend being identified by the data template.

13. The method of claim 8, the execution of the script program further comprising:

executing the script program with reference to a data template in an XML format.

14. The method of claim 8, the selection of the script program with reference to manufacturer data further comprising:

selecting the script program with reference to package data received from a manufacturer.

* * * * *

UNITED STATES PATENT AND TRADEMARK OFFICE
CERTIFICATE OF CORRECTION

PATENT NO. : 10,135,630 B2  
APPLICATION NO. : 13/321507  
DATED : November 20, 2018  
INVENTOR(S) : Rafael Heredia et al.

Page 1 of 1

It is certified that error appears in the above-identified patent and that said Letters Patent is hereby corrected as shown below:

On the Title Page

Item (73):
The Assignee (73) should be listed as Zipit Wireless, Inc.

Signed and Sealed this
Twenty-sixth Day of May, 2020

Andrei Iancu
*Director of the United States Patent and Trademark Office*